(12) United States Patent
Kamiyoshi et al.

(10) Patent No.: US 8,802,592 B2
(45) Date of Patent: Aug. 12, 2014

(54) RESIN COMPOSITION FOR PROTECTIVE LAYER TRANSFER SHEETS

(75) Inventors: Nobumichi Kamiyoshi, Wakayama (JP); Takashi Mukai, Wakayama (JP); Toshifusa Hirano, Okayama (JP); Masahiro Yuki, Okayama (JP)

(73) Assignees: Kao Corporation, Tokyo (JP); Dai Nippon Printing Co., Ltd., Tokyo (JP)

( * ) Notice: Subject to any disclaimer, the term of this patent is extended or adjusted under 35 U.S.C. 154(b) by 48 days.

(21) Appl. No.: 13/518,719

(22) PCT Filed: Nov. 9, 2010

(86) PCT No.: PCT/JP2010/069965
§ 371 (c)(1),
(2), (4) Date: Aug. 9, 2012

(87) PCT Pub. No.: WO2011/077845
PCT Pub. Date: Jun. 30, 2011

(65) Prior Publication Data
US 2012/0321861 A1 Dec. 20, 2012

(30) Foreign Application Priority Data
Dec. 25, 2009 (JP) .................................. 2009-296163

(51) Int. Cl.
*B41M 5/382* (2006.01)
*B41M 7/00* (2006.01)

(52) U.S. Cl.
CPC ......... *B41M 5/38264* (2013.01); *B41M 7/0027* (2013.01); *B41M 2205/40* (2013.01)
USPC ........................................ 503/227; 428/32.6

(58) Field of Classification Search
CPC ........... B41M 5/38264; B41M 7/0027; B41M 2205/40
USPC ........................................ 503/227; 428/32.6
See application file for complete search history.

(56) References Cited

U.S. PATENT DOCUMENTS

| | | | |
|---|---|---|---|
| 4,528,341 A * | 7/1985 | Belder et al. .................. | 525/438 |
| 6,043,194 A | 3/2000 | Saito et al. | |
| 6,239,069 B1 | 5/2001 | Asai | |
| 6,326,115 B1 | 12/2001 | Nakanishi et al. | |
| 6,346,316 B1 | 2/2002 | Saito et al. | |
| 2002/0160160 A1 | 10/2002 | Suzuki et al. | |
| 2006/0198971 A1 | 9/2006 | Obonai et al. | |

FOREIGN PATENT DOCUMENTS

| | | |
|---|---|---|
| JP | 8-20636 A | 1/1996 |
| JP | 10-239903 A | 9/1998 |
| JP | 11-133668 A | 5/1999 |
| JP | 11-151867 A | 6/1999 |
| JP | 2000-071619 A | 3/2000 |
| JP | 2002-240404 A | 8/2002 |
| JP | 2003-251909 A | 9/2003 |
| JP | 2004-074768 A | 3/2004 |
| JP | 2004-114649 A | 4/2004 |
| JP | 2005-36237 A | 2/2005 |
| JP | 2006-272960 A | 10/2006 |
| WO | WO 03/078513 A1 | 9/2003 |

OTHER PUBLICATIONS

Machine English translation for JP-2003-251909-A dated Sep. 9, 2003.
Machine English translation for JP-2004-114649-A dated Apr. 15, 2004.
Machine English translation for JP-2004-74768-A dated Mar. 11, 2004.
International Search Report for PCT/JP2010/069965 dated Dec. 7, 2010.
The Search Report, dated Apr. 15, 2014, issued in the corresponding European Patent Application No. 10839081.6.

* cited by examiner

*Primary Examiner* — Bruce H Hess
(74) *Attorney, Agent, or Firm* — Birch, Stewart, Kolasch & Birch, LLP

(57) ABSTRACT

The present invention relates to a resin composition for protective layer transfer sheets which includes a polyester resin produced by polycondensing a polyhydric alcohol component containing a hydrogenated bisphenol A in an amount of 30 mol % or more and a polycarboxylic acid component containing a benzenedicarboxylic acid in an amount of 50 mol % or more.

6 Claims, No Drawings

RESIN COMPOSITION FOR PROTECTIVE LAYER TRANSFER SHEETS

TECHNICAL FIELD

The present invention relates to a resin composition for protective layer transfer sheets, and a protective layer transfer sheet containing the resin composition and a print using the protective layer transfer sheet.

BACKGROUND ART

There has been proposed the method for forming color images on a thermal transfer image-receiving sheet which is dyeable with a sublimation dye by using a thermal transfer sheet constituted of the sublimation dye as a recording agent and a substrate on which the sublimation dye is supported. In this method, the dye is heated using a thermal head of a printer as a heating means and transferred on the image-receiving sheet to obtain the color images. The thus formed color images are very clear and excellent in transparency because of use of the dye, and are therefore expected to provide high-quality images which are excellent in reproducibility of half tones and gradation. However, the dye tends to suffer from color fading when exposed to external stimulus such as light, which will result in occurrence of color fading on prints obtained using the dye.

In order to prevent occurrence of color fading of the prints, there has been used the method in which a protective layer is transferred from a protective layer transfer sheet onto an image-receiving sheet to protect images formed on the image-receiving sheet.

Patent Document 1 discloses a polyester resin for use in a protective film for sublimation-transfer image-receiving members which is produced by copolymerizing a monomer having an alicyclic skeleton with an acid component and/or a glycol component in an amount of 15 mol % or more, for the purpose of improving a sensitivity and an image storage property.

Patent Document 2 discloses a protective layer transfer sheet including a base sheet and a thermally transferring protective layer formed on at least a part of one surface of the base sheet, in which the protective layer is in the form of a laminate having at least two layers including a layer containing at least an acrylic resin as a main component and a layer containing a polyester resin as a main component which are successively formed on the base sheet in this order.

CITATION LIST

Patent Literature

[Patent Document 1]: JP 2005-036237A
[Patent Document 2]: JP 2002-240404A

SUMMARY OF INVENTION

Technical Problem

The protective layer transfer sheet includes an adhesive layer to be bonded to a surface of a dye receptor layer of the image-receiving sheet. The adhesive layer is formed of a resin composition which is capable of bonding to the dye receptor layer by heat applied upon printing. In order to form a thin uniform protective layer on an image-bearing surface of the image-receiving sheet, a solution prepared by dissolving the resin composition in an organic solvent is generally applied thereonto. However, the resin as a high-molecular compound tends to be hardly dissolved in the solvent and crystallized and precipitated upon storage of the solution, so that there tends to occur such a problem that a uniformity of the resulting protective layer is inhibited by the insoluble components in the solution when coated.

In addition, the protective layer is inherently formed for the purpose of preventing color fading of dyes owing to external stimulus. Although it is required that the protective layer is a transparent layer to clearly recognize images underneath the layer, if light is allowed to fully penetrate through the protective layer, there tends to occur such a problem that the protective layer fails to prevent color fading of the images.

Further, the protective layer transfer sheet is usually produced as a part of an ink ribbon (hereinafter occasionally also referred to as a "heat-sensitive transfer ink sheet") including a thermal transfer dye layer and a thermal transfer protective layer, and the ink ribbon produced is wound up into a roll for storage thereof. In such a case, the dye is migrated into a back surface of the ink ribbon (which is opposite to the surface on which the thermal transfer dye layer and thermal transfer protective layer are provided), and when the ink ribbon is wound up again, the dye tends to be migrated to an adhesive layer formed on the thermal transfer protective layer. As a result, there tends to occur such a so-called "kickback phenomenon" that the dye attached to the adhesive layer is migrated onto images when the protective layer is transferred thereonto so that the images tend to be considerably stained with the dye.

The problem to be solved by the present invention is to provide a resin composition for protective layer transfer sheets which is excellent in coating solution storing property, and capable of providing a protective layer transfer sheet having an excellent anti-kickback property and a print having an excellent light fastness, and a protective layer transfer sheet containing the resin composition and a print using the protective layer transfer sheet.

Solution to Problem

The present inventors have found that when using a resin composition containing a specific polyester resin in a layer of the protective layer transfer sheet which is to be bonded to a surface of a thermal transfer image-receiving sheet, it is possible to enhance a storage property of a coating solution containing the resin composition, and a light fastness and an anti-kickback property of the protective layer transfer sheet.

That is, the present invention relates to the following [1] to [4].

[1] A resin composition for protective layer transfer sheets, including a polyester resin produced by polycondensing a polyhydric alcohol component containing a hydrogenated bisphenol A in an amount of 30 mol % or more and a polycarboxylic acid component containing a benzenedicarboxylic acid in an amount of 50 mol % or more.

[2] A process for producing the resin composition for protective layer transfer sheets as described in the above [1], including the step of polycondensing a polyhydric alcohol component containing a hydrogenated bisphenol A in an amount of 30 mol % or more and a polycarboxylic acid component containing a benzenedicarboxylic acid in an amount of 50 mol % or more to obtain a polyester resin.

[3] A protective layer transfer sheet including a layer to be bonded to a surface of a thermal transfer image-receiving sheet, wherein the resin composition for protective layer transfer sheets as described in the above [1] is incorporated in the layer.

[4] A print including a printed surface on which images are formed by a thermal transfer printing method, and a protective layer transferred and formed on the printed surface by using the protective layer transfer sheet as described in the above [3].

Advantageous Effects of Invention

The resin composition for protective layer transfer sheets according to the present invention is capable of forming a coating solution having an excellent storing property, and further the protective layer transfer sheet according to the present invention which is produced from the coating solution containing the resin composition after storage of the coating solution is capable of forming a thin uniform protective layer on an image-bearing surface of an image-receiving sheet. In addition, the protective layer transfer sheet containing the resin composition according to the present invention is excellent in anti-kickback property so that the dye is hardly migrated onto an adhesive layer formed in the thermal transfer protective layer. Further, the print obtained by transferring the protective layer onto the image-receiving sheet using the protective layer transfer sheet is excellent in light fastness, and can be prevented from suffering from color fading of the dye owing to exposure to light.

DESCRIPTION OF EMBODIMENTS

[Resin Composition for Protective Layer Transfer Sheets]

The resin composition for protective layer transfer sheets according to the present invention includes a polyester resin produced by polycondensing a polyhydric alcohol component containing a hydrogenated bisphenol A (2,2'-bis(4-hydroxycyclohexyl)propane) in an amount of 30 mol % or more and a polycarboxylic acid component containing a benzenedicarboxylic acid in an amount of 50 mol % or more.

The resin composition for protective layer transfer sheets according to the present invention is used in a layer which is formed in a protective layer transfer sheet and bonded to a surface of an image-receiving sheet, and therefore is preferably incorporated in an outermost layer in the protective layer transfer sheet.

The resin composition for protective layer transfer sheets according to the present invention is capable of forming a coating solution having an excellent storing property, and further capable of providing a protective layer transfer sheet having an excellent anti-kickback property as well as a print having an excellent light fastness. The reason therefor is considered as follows although not clearly determined.

That is, the polyester resin obtained by polycondensing a polyhydric alcohol component containing a hydrogenated bisphenol A in an amount of 30 mol % or more and a polycarboxylic acid component containing a benzenedicarboxylic acid in an amount of 50 mol % or more is similar in structure to a hydrocarbon solvent and a ketone solvent which are generally used for a coating solution. As a result, it is considered that the polyester resin has an excellent solubility in the solvent and a high stability in the coating solution and, therefore, is capable of forming a uniform coating film. On the other hand, the polyester resin is different in structure from dyes which are generally used for thermal transfer printing, and therefore has a less affinity to the dyes. As a result, it is considered that when using the resin composition containing the polyester resin in the protective layer transfer sheet, the dyes are hardly migrated thereto, so that the resulting protective layer transfer sheet is excellent in not only light fastness but also anti-kickback property. In addition, the relatively rigid structure of each of the hydrogenated bisphenol A and the benzenedicarboxylic acid acts for hardening the polyester resin itself and therefore is considered to be one of reasons for enhancing the light fastness and anti-kickback property.

(Polyester Resin)

The polyester resin contained in the resin composition according to the present invention is produced by polycondensing a polyhydric alcohol component containing a hydrogenated bisphenol A in an amount of 30 mol % or more and a polycarboxylic acid component containing a benzenedicarboxylic acid in an amount of 50 mol % or more.

<Polyhydric Alcohol Component>

The polyhydric alcohol component as a monomer as raw material of the polyester resin contained in the resin composition according to the present invention contains a hydrogenated bisphenol A in an amount of 30 mol % or more.

The content of the hydrogenated bisphenol A in the polyhydric alcohol component in the monomers as raw material of the polyester resin is 30 mol % or more, and preferably 50 mol % or more from the viewpoints of a good coating solution storing property, a high light fastness and a high anti-kickback property. Further, from the viewpoints of a high light fastness and a high anti-kickback property, the content of the hydrogenated bisphenol A in the polyhydric alcohol component is more preferably 80 mmol % or more, and still more preferably substantially 100 mol %.

The polyhydric alcohol component in the monomers as raw material of the polyester resin may also contain, in addition to the hydrogenated bisphenol A, an aliphatic polyol having 2 to 6 carbon atoms in an amount of preferably from 10 to 70 mol %, more preferably from 20 to 50 mol % and still more preferably from 20 to 40 mol % from the viewpoints of achieving a good coating solution storing property and satisfying all of a good coating solution storing property, a high light fastness and a high anti-kickback property.

It is considered that the aliphatic polyol having 2 to 6 carbon atoms which is contained in the monomers as raw material of the polyester resin serves for further enhancing a solubility of the resin composition according to the present invention in the solvent and thereby further improving a coating solution storing property of the resin composition. Specific examples of the aliphatic polyol include triols having 3 to 6 carbon atoms and diols having 2 to 6 carbon atoms. Among these aliphatic polyols, preferred are those aliphatic polyols containing triols having 3 to 6 carbon atoms, and more preferred are those aliphatic polyols containing both triols having 3 to 6 carbon atoms and diols having 2 to 6 carbon atoms. The molar ratio of the triols having 3 to 6 carbon atoms to the diols having 2 to 6 carbon atoms (triols/diols) in the aliphatic polyols is preferably from 1/9 to 6/4, more preferably from 1/9 to 4/6 and still more preferably from 2/8 to 3/7.

Examples of the triols having 3 to 6 carbon atoms include glycerol and trimethylol propane. Among these triols, preferred is trimethylol propane.

Examples of the diols having 2 to 6 carbon atoms include linear aliphatic diols such as ethylene glycol, 1,3-propanediol, 1,4-butanediol, 1,5-pentanediol, 1,6-hexanediol and 1,4-butenediol; and branched chain-type aliphatic diols such as 1,2-propanediol, 1,3-butanediol and neopentyl glycol. Among these diols, preferred are the linear aliphatic diols, and more preferred is ethylene glycol.

When the aliphatic diols contain both of the triols having 3 to 6 carbon atoms and the diols having 2 to 6 carbon atoms, any combination of the triols and the diols may be selectively used, but preferred is the combination of trimethylol propane with ethylene glycol.

The polyhydric alcohol component used as the monomer as raw material of the polyester resin contained in the resin composition according to the present invention may contain, in addition to the above compounds, optional other polyhydric alcohols unless the effects of the present invention are adversely affected. Examples of the optional other polyhydric alcohols include linear aliphatic diols such as 1,7-heptanediol, 1,8-octanediol, 1,9-nonanediol and 1,10-decanediol; branched chain-type aliphatic diols such as 2-butyl-2-ethyl-1,3-propanediol; alicyclic diols such as cyclohexane dimethanol; aromatic diols such as alkyleneoxide adducts of 2,2-bis(4-hydroxyphenyl)propane (alkyleneoxide adducts of bisphenol A); and trivalent or higher-valent polyhydric alcohols such as pentaerythritol.

The above polyhydric alcohols may be used alone or in combination of any two or more thereof. Further, a monohydric alcohol may also be used together with the above polyhydric alcohols unless the effects of the present invention are adversely affected.

<Polycarboxylic Acid Component>

The polycarboxylic acid component as a monomer as raw material of the polyester resin contained in the resin composition according to the present invention contains a benzenedicarboxylic acid unit in an amount of 50 mol % or more.

The content of the benzenedicarboxylic acid in the polycarboxylic acid component in the monomers as raw material of the polyester resin is 50 mol % or more, preferably 70 mol % or more, more preferably 90 mol % or more and still more preferably substantially 100 mol %, from the viewpoints of achieving a high anti-kickback property and satisfying all of a good coating solution storing property, a high light fastness and a high anti-kickback property.

It is considered that since the benzenedicarboxylic acid is capable of producing a polyester resin having a rigid structure while maintaining a high solubility in the solvent, it is possible to satisfy all of the aimed effects of the present invention and, in particular, enhance an anti-kickback property of the resin composition.

Examples of the benzenedicarboxylic acid in the monomers as raw material of the polyester resin include isophthalic acid, terephthalic acid and phthalic acid. From the viewpoints of a good coating solution storing property, a high light fastness and a high anti-kickback property, among these benzenedicarboxylic acids, preferred is isophthalic acid.

The polycarboxylic acid component in the monomers as raw material of the polyester resin may contain the respective benzenedicarboxylic acids alone or in combination of any two or more thereof. The polycarboxylic acid component preferably contains an isophthalic acid unit in an amount of 70 mol % or more, more preferably 90 mol % or more and still more preferably substantially 100 mol %.

The polycarboxylic acid component as the monomer as raw material of the polyester resin contained in the resin composition according to the present invention may contain, in addition to the benzenedicarboxylic acid, an optional other polycarboxylic acid unless the effects of the present invention are adversely affected. Examples of the optional other polycarboxylic acid include unsubstituted aliphatic dicarboxylic acids such as sebacic acid, fumaric acid, maleic acid, adipic acid, azelaic acid and succinic acid; aliphatic dicarboxylic acids substituted with an alkyl group having 1 to 20 carbon atoms or with an alkenyl group having 2 to 20 carbon atoms such as dodecyl succinic acid, dodecenyl succinic acid and octenyl succinic acid; alicyclic dicarboxylic aids such as cyclohexanedicarboxylic acid and cyclohexenedicarboxylic acid; and trivalent or higher-valent polycarboxylic acids such as trimellitic acid, 2,5,7-naphthalenetricarboxylic acid and pyromellitic acid, and anhydrides and alkyl ($C_1$ to $C_3$) ester of these acids. Among these polycarboxylic acids, from the viewpoints of a high light fastness and a high anti-kickback property, preferred is cyclohexanedicarboxylic acid.

The above polycarboxylic acids may be used alone or in combination of any two or more thereof. In addition, a monocarboxylic acid may be used in the polycarboxylic acid component of the polyester resin unless the effects of the present invention are adversely affected.

The polyester resin contained in the resin composition according to the present invention is synthesized from the raw material components including the polyhydric alcohol component containing a hydrogenated bisphenol A in an amount of 30 mol % or more and a polycarboxylic acid component containing a benzenedicarboxylic acid in an amount of 50 mol % or more.

For example, the polyester resin may be produced by polycondensing the above polyhydric alcohol component and polycarboxylic acid component in an inert gas atmosphere at a temperature of from 180 to 250° C., if required, in the presence of an esterification catalyst. From the viewpoints of a good coating solution storing property, a high light fastness and a high anti-kickback property, the polyester resin preferably has a sharp molecular weight distribution and is preferably produced by a polycondensation reaction using the esterification catalyst. Examples of the esterification catalyst include tin catalysts, titanium catalysts, and metal compounds such as antimony trioxide, zinc acetate and germanium dioxide. Among these esterification catalysts, from the viewpoint of a high esterification reaction efficiency upon synthesis of the polyester, preferred are tin catalysts. Examples of the tin catalysts include dibutyl tin oxide, tin dioctylate and salts of these compounds.

The softening point of the polyester resin is preferably from 80 to 200° C., more preferably from 100 to 180° C. and still more preferably from 120 to 180° C. from the viewpoints of a good coating solution storing property, a high light fastness and a high anti-kickback property. The glass transition temperature of the polyester resin is preferably from 65 to 140° C., more preferably from 70 to 120° C. and still more preferably from 80 to 115° C. The acid value of the polyester resin is preferably from 0.1 to 30 mg KOH/g, more preferably from 0.1 to 20 mg KOH/g and still more preferably from 0.1 to 10 mg KOH/g from the viewpoint of a high light fastness.

The number-average molecular weight of the polyester resin is preferably from 1,000 to 10,000, more preferably from 1,500 to 8,000, still more preferably from 2,000 to 4,000 and especially preferably from 2,000 to 3,000 from the viewpoints of a good coating solution storing property, a high light fastness and a high anti-kickback property.

These properties of the polyester resin may be achieved by appropriately selecting the monomers as raw material, in particular, the average molecular weight of the polyester resin can be achieved by controlling the valences of the alcohol component and carboxylic acid component used for production thereof and the proportion therebetween.

Meanwhile, in the present invention, the polyester resin may be in the form of a modified polyester which is obtained by modifying a polyester to such an extent that substantially no properties thereof are adversely affected by the modification. Examples of the modified polyester include those polyesters which are grafted or blocked with a phenol, a urethane, an epoxy compound, etc., as described in JP 11-133668A, JP 10-239903A, JP 8-20636A or the like.

(Resin Composition)

The resin composition according to the present invention contains the above polyester resin. The content of the polyester resin in the resin composition according to the present invention is preferably 80% by weight or more, more preferably 90% by weight or more, and still more preferably substantially 100% by weight on the basis of the weight of the resin composition from the viewpoints of a good coating solution storing property, a high light fastness and a high anti-kickback property.

The resin composition according to the present invention may also contain resins other than the above polyester resin unless the effects of the present invention are adversely affected. Examples of the other resins include olefin-based resins such as polypropylene; halogenated polymers such as polyvinyl chloride and polyvinylidene chloride; vinyl polymers such as polyvinyl acetate, polyacrylic esters and polyvinyl acetal; polystyrene-based resins; polyamide-based resins; copolymer resins of an olefin such as ethylene and propylene with the other vinyl monomers; ionomers; cellulose-based resins such as cellulose distearate; and polycarbonates.

The process for producing the resin composition according to the present invention includes the step of polycondensing the polyhydric alcohol component containing a hydrogenated bisphenol A in an amount of 30 mol % or more and the polycarboxylic acid component containing a benzenedicarboxylic acid in an amount of 50 mol % or more to obtain the above polyester resin.

[Protective Layer Transfer Sheet]

In the protective layer transfer sheet according to the present invention, the above resin composition for protective layer transfer sheets is incorporated in a layer (outermost layer) of the protective layer transfer sheet which is bonded to a surface of an image-receiving sheet. The layer which is bonded to a surface of an image-receiving sheet as used herein means a layer formed mainly of a resin which includes a surface that comes into a direct contact with an image-bearing surface of the image-receiving sheet when transferring and forming a protective layer onto the image-bearing surface using the protective layer transfer sheet.

In the protective layer transfer sheet according to the present invention, the protective layer and an adhesive layer are preferably successively formed on a substrate for protective layer transfer sheets in this order. When forming the protective layer on an outermost surface of the protective layer transfer sheet, the protective layer also serves as an adhesive layer. Therefore, the resin composition according to the present invention is preferably incorporated in the protective layer.

The protective layer transfer sheet according to the present invention is preferably produced by sequentially applying solutions or dispersions for forming the respective layers which contain the resin composition or the like, and then drying the applied solutions or dispersions.

(Substrate for Protective Layer Transfer Sheets)

Examples of the substrate used in the protective layer transfer sheet according to the present invention include thin papers such as glassine paper, condenser paper and paraffin paper; polyesters having a high heat resistance such as polyethylene terephthalate, polyethylene naphthalate, polybutylene terephthalate, polyphenylene sulfides, polyether ketones and polyether sulfones; stretched or unstretched films of plastics such as polypropylene, polycarbonates, cellulose acetate, polyethylene derivatives, polyvinyl chloride, polyvinylidene chloride, polystyrene, polyamides, polyimides, polymethyl pentene and ionomers; and materials obtained by subjecting the surface of the above-mentioned materials to easy-bonding treatment, etc., and laminates formed of these materials.

The thickness of the substrate may be appropriately determined such that the resulting protective layer transfer sheet has adequate properties such as a high strength and a high heat resistance, and is generally from 1 to 100 µm.

(Release Layer)

The protective layer transfer sheet according to the present invention may also include a release layer from the viewpoint of a good releasability of the protective layer from the substrate upon thermal transfer thereof. In this case, the release layer, the protective layer and the adhesive layer may be successively formed on the substrate in this order.

Examples of the preferred materials used for forming the release layer include waxes, silicone waxes, silicone resins, fluororesins, acrylic resins, polyvinyl alcohol resins, cellulose derivative resins, urethane-based resins, vinyl acetate-based resins, acrylic vinyl ether-based resins, maleic anhydride resins and copolymers of these resins. The thickness of the release layer is preferably from 0.5 to 5 µm.

When forming the release layer in the protective layer transfer sheet according to the present invention, the release layer is preferably formed by applying a coating solution prepared by dissolving or dispersing the waxes or resins constituting the release layer in an organic solvent, etc., by an appropriate coating method such as a gravure coating method and a gravure reverse coating method, and then drying the applied coating solution.

(Protective Layer)

The protective layer is transferred on printed images and functions for protecting the printed images.

The protective layer may be formed on the release layer in the case where the protective layer transfer sheet is provided with the release layer, or may be formed on the substrate in the case where the protective layer transfer sheet is provided with no release layer.

The protective layer may be formed of resins such as thermoplastic resins, heat-crosslinking resins and ionizing radiation-crosslinking resins. Examples of the thermoplastic resins include polyester-based resins, polycarbonates, urethane resins, epoxy-based resins, phenoxy resins, acrylic resins, and silicone-modified products of these resins. These thermoplastic resins may be used alone or in combination of any two or more thereof.

As described above, when the protective layer is formed on an outermost surface of the protective layer transfer sheet, the protective layer also functions as an adhesive layer. Therefore, the resin composition according to the present invention is preferably incorporated in the protective layer.

The protective layer may appropriately contain, in addition to the above resins, various additives such as ultraviolet screening resins, ultraviolet absorbers (e.g., reactive ultraviolet absorbers), conductive resins and fillers, if required.

The protective layer may be in the form of either a single layer or a laminate constituted of two or more layers which are different in composition, etc, from each other.

The total thickness of the protective layer is preferably from 0.1 to 30 µm, more preferably from 0.5 to 5 µm and still more preferably from 1 to 5 µm.

As the reactive ultraviolet absorbers, there may be used those ultraviolet absorbers obtained, for example, by introducing an addition-polymerizable double bond such as a vinyl group, an acryloyl group and a methacryloyl group, or an alcoholic hydroxyl group, an amino group, a carboxyl group, an epoxy group, an isocyanate group or the like, into non-reactive ultraviolet absorbers as conventionally known organic ultraviolet absorbers such as salicylate-based ultraviolet absorbers, benzophenone-based ultraviolet absorbers, benzotriazole-based ultraviolet absorbers, triazine-based ultraviolet absorbers, substituted acrylonitrile-based ultraviolet absorbers, nickel chelate-based ultraviolet absorbers and hindered amine-based ultraviolet absorbers. Among these reactive ultraviolet absorbers, especially preferred are the benzophenone-based ultraviolet absorbers represented by the following general formula 1 and the benzotriazole-based ultraviolet absorbers represented by the following general formula 2.

General Formula 1

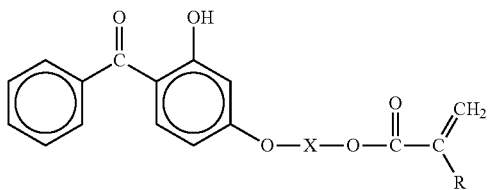

wherein R is H or $CH_3$; and X is —$CH_2$—$CH_2$— or —$CH_2$—CH(OH)—$CH_2$—.

General Formula 2

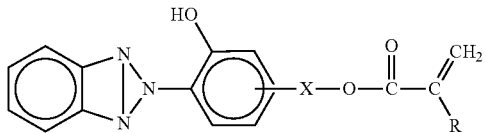

wherein R is H or $CH_3$; and X is —$CH_2$—$CH_2$— or —$CH_2$—CH(OH)—$CH_2$—.

The content of the reactive ultraviolet absorber in the protective layer is preferably from 10 to 85 parts by mass and more preferably from 30 to 50 parts by mass on the basis of 100 parts by mass of the resin component forming the protective layer from the viewpoint of a high light fastness.

Specific examples of the filler include organic fillers and/or inorganic fillers such as polyethylene waxes, bisamides, nylons, acrylic resins, crosslinked polystyrene, silicone resins, silicone rubbers, talc, calcium carbonate, titanium oxide, and silica fine powders such as micro silica and colloidal silica. The fillers used in the present invention are not particularly limited, and preferably include those having a good slip property. The particle size of the filler is preferably 10 μm or less, and more preferably from 0.1 to 3 μm.

The content of the filler in the protective layer is preferably in the range of from 0 to 100 parts by mass on the basis of 100 parts by mass of the resin component forming the protective layer, i.e., to such an extent that the protective layer when being transferred maintains a good transparency.

(Adhesive Layer)

The adhesive layer of the protective layer transfer sheet according to the present invention contains the above resin composition for protective layer transfer sheets. As described above, when the protective layer is formed on an outermost surface of the protective layer transfer sheet, the protective layer also functions as an adhesive layer. Therefore, the protective layer preferably satisfies the following combined conditions.

The thickness of the adhesive layer is preferably from 0.1 to 50 μm, more preferably from 0.5 to 15 μm and still more preferably from 1 to 5 μm, from the viewpoints of a good image quality and a high productivity.

The adhesive layer is preferably formed by the following method.

The above resin composition for protective layer transfer sheets according to the present invention is dissolved or dispersed in an organic solvent to prepare a coating solution.

As the organic solvent, there may be used ketone-based solvents, hydrocarbon-based solvents and mixed solvents of these solvents. Among the ketone-based solvents, preferred is methyl ethyl ketone. Among the hydrocarbon-based solvents, preferred is toluene. From the viewpoint of well dissolving the resin composition of the present invention to form a uniform coating film thereof on the substrate or protective layer, preferred is a mixed solvent of the ketone-based solvent and the hydrocarbon-based solvent, and more preferred is a mixed solvent of methyl ethyl ketone and toluene. The resin composition according to the present invention includes the polyester resin obtained by polycondensing a polyhydric alcohol component containing a hydrogenated bisphenol A in an amount of 30 mol % or more and a polycarboxylic acid component containing a benzenedicarboxylic acid in an amount of 50 mol % or more, and therefore can exhibit a high solubility in these solvents and an excellent dissolution stability upon storage.

Next, the thus prepared coating solution is applied onto one surface of the substrate, preferably applied onto a surface of the protective layer formed on the surface of the substrate to form a coating film thereon. The coating solution prepared using the resin composition according to the present invention is excellent in dissolution stability and capable of forming a uniform coating film. Examples of the preferred coating method used upon applying the coating solution include a gravure printing method, a screen printing method, and a reverse roll coating method using a gravure printing plate. The thus formed coating film is dried to remove the solvent therefrom, so that the adhesive layer is formed.

[Print]

The print according to the present invention includes a printed surface on which images are formed by a thermal transfer printing method, and a protective layer which is transferred and formed onto the printed surface using the above protective layer transfer sheet. The thermal transfer printing method is a method for obtaining a print in which a thermal transfer ink sheet is brought into press-contact with a surface of an image-receiving layer of a thermal transfer image-receiving sheet under heating to transfer dyes of the ink sheet onto the image-receiving layer and form images thereon. The print according to the present invention is produced by the above method, i.e., by allowing the protective layer transfer sheet of the present invention to come into press-contact with the printed surface under heating such that a bonding surface of the protective layer transfer sheet faces to the printed surface to thereby transfer the adhesive layer and protective layer onto the printed surface.

(Thermal Transfer Image-Receiving Sheet)

The thermal transfer image-receiving sheet forming the print according to the present invention includes a dye receptor layer formed on a paper or a polyester film. In the present invention, there may be used an optional thermal transfer image-receiving sheet.

(Thermal Transfer Ink Sheet)

The thermal transfer ink sheet used for producing the print according to the present invention includes a substrate such as a paper or a polyester, and a dye layer containing a sublimation dye which is formed on the substrate. However, as far as the protective layer and adhesive layer can be transferred after printing images with the ink, the above dye layer may be provided on a surface of the substrate constituting the protective layer transfer sheet of the present invention. Therefore, the thermal transfer ink sheet may have such a structure that dye layers for the respective colors and the protective layer are successively provided on the surface of the substrate.

Examples of the sublimation dye suitably used in the thermal transfer ink sheet include yellow dyes such as pyridone-azo-based dyes, dicyano-styryl-based dyes, quinophthalone-based dyes and merocyanine-based dyes; magenta dyes such as benzene-azo-based dyes, pyrazolone-azomethine-based dyes, isothiazole-based dyes and pyrazolo-triazole-based dyes; and cyan dyes such as anthraquinone-based dyes, cyano-methylene-based dyes, indophenol-based dyes and indonaphthol-based dyes.

As the method for applying a heat energy upon the thermal transfer, there may be used any optional methods, for example, the method of applying a heat energy of from about 5 to about 100 mJ/mm² by controlling a recording time using a recording apparatus such as a thermal printer.

EXAMPLES

In the followings, the "%" and "part(s)" indicate "% by weight" and "part(s) by weight", respectively, unless otherwise specified.

Production Examples 1 to 6, 9, 10 and 14

Production of Polyesters (a) to (f), (i), (j) and (n)

The monomers as raw material of the polyester as shown in Table 1 and tin (II) dioctylate were charged into a 5 L four-necked flask equipped with a thermometer, a stainless steel stirring rod, a fractionating tube, a falling type condenser and a nitrogen inlet tube. The contents of the flask were reacted in a mantle heater in a nitrogen atmosphere at 215° C. for 5 hours, and further reacted under reduced pressure (20 kPa) until a softening point of the reaction product reached the temperature shown in Table 1 as measured according to ASTM D36-86, thereby obtaining polyesters (a) to (f), (i), (j) and (n).

Production Examples 7 and 8

Production of Polyesters (g) and (h)

The monomers as raw material of the polyester except for fumaric acid as shown in Table 1 and tin (II) dioctylate were charged into a 5 L four-necked flask equipped with a thermometer, a stainless steel stirring rod, a falling type condenser and a nitrogen inlet tube. The contents of the flask were reacted in a mantle heater in a nitrogen atmosphere at 235° C. for 8 hours, and further reacted under reduced pressure (8.3 kPa) for 1 hour. Next, fumaric acid and 4-t-butyl catechol were added to the flask at 200° C., and the resulting mixture was reacted for 1 hour, and then further reacted under reduced pressure (20 kPa) until a softening point of the reaction product reached the temperature shown in Table 1 as measured according to ASTM D36-86, thereby obtaining polyesters (g) and (h).

Production Examples 11 and 12

Production of Polyesters (k) and (l)

The monomers as raw material of the polyester except for trimellitic anhydride as shown in Table 1 and tin (II) dioctylate were charged into a 5 L four-necked flask equipped with a thermometer, a stainless steel stirring rod, a falling type condenser and a nitrogen inlet tube. The contents of the flask were reacted in a mantle heater in a nitrogen atmosphere at 235° C. for 8 hours, and further reacted under reduced pressure (8.3 kPa) for 1 hour. Next, trimellitic anhydride was added to the flask at 200° C., and the resulting mixture was reacted for 1 hour, and then further reacted under reduced pressure (20 kPa) until a softening point of the reaction product reached the temperature shown in Table 1 as measured according to ASTM D36-86, thereby obtaining polyesters (k) and (l).

Production Example 13

Production of Polyester (m)

The monomers as raw material of the polyester as shown in Table 1 and tin (II) dioctylate were charged into a 5 L four-necked flask equipped with a thermometer, a stainless steel stirring rod, a fractionating tube, a falling type condenser and a nitrogen inlet tube. The contents of the flask were reacted in a mantle heater in a nitrogen atmosphere at 235° C. for 10 hours, and further reacted under reduced pressure (20 kPa) until a softening point of the reaction product reached the temperature shown in Table 1 as measured according to ASTM D36-86, thereby obtaining a polyester (m).

The properties of the thus obtained polyesters (a) to (n) were measured by the following methods. The results are shown in Table 1.

[Softening Point and Glass Transition Temperature]
(1) Softening Point

Using a flow tester "CFT-500D" (tradename) available from Shimadzu Corporation, 1 g of a sample was extruded through a nozzle having a die pore diameter of 1 mm and a length of 1 mm while heating the sample at a temperature rise rate of 6° C./min and applying a load of 1.96 MPa thereto by a plunger. The softening point was determined as the temperature at which a half amount of the sample was flowed out when plotting a downward movement of the plunger of the flow tester relative to the temperature.

(2) Glass Transition Temperature

Using a differential scanning calorimeter ("Pyris 6 DSC" (tradename) available from Perkin Elmer, Inc.), a sample was heated to 200° C. and then cooled from 200° C. to 0° C. at a temperature drop rate of 10° C./min, and thereafter heated again at a temperature rise rate of 10° C./min to prepare a thermal characteristic curve thereof. The temperature at which an extension of a baseline was intersected with a tangential line having a maximum inclination of the curve in a region of from a rise-up portion of the peak to an apex of the peak was read as the glass transition temperature of the sample.

[Acid Value of Resin]

The acid value of a resin was measured by the same method as prescribed in JIS K0070 except that the mixed solvent of ethanol and an ether used upon the measurement was replaced with a mixed solvent containing acetone and toluene at a volume ratio of 1:1

[Number-Average Molecular Weight of Resin]

The number-average molecular weight was calculated from the molecular weight distribution as measured by gel permeation chromatography according to the following method.

(1) Preparation of Sample Solution

The binder resin was dissolved in tetrahydrofuran to prepare a solution having a concentration of 0.5 g/100 mL. The resultant solution was then filtered through a fluororesin filter ("FP-200" (tradename) available from Sumitomo Electric Industries, Co., Ltd.) having a pore size of 2 μm to remove insoluble components therefrom, thereby preparing a sample solution.

(2) Measurement of Molecular Weight

Tetrahydrofuran as a dissolvent was allowed to flow at a rate of 1 mL/min, and the column was stabilized in a thermostat at 40° C. One-hundred microliters of the sample solution were injected into the column to measure a molecular weight distribution thereof. The number-average molecular weight of the sample was calculated on the basis of a calibration curve previously prepared. The calibration curve of the molecular weight was prepared by using several kinds of monodisperse polystyrenes (those monodisperse polystyrenes having weight-average molecular weights of $2.63 \times 10^3$, $2.06 \times 10^4$ and $1.02 \times 10^5$ available from Tosoh Corp.; and those monodisperse polystyrenes having weight-average molecular weights of $2.10 \times 10^3$, $7.00 \times 10^3$ and $5.04 \times 10^4$ available from GL Sciences Inc.) as reference standard samples.

Analyzer: CO-8010 (tradename; available from Tosoh Corp.)

Column: GMHLX+G3000HXL (tradenames; both available from Tosoh Corp.)

TABLE 1

| | | | Production Examples | | | | | | |
|---|---|---|---|---|---|---|---|---|---|
| | | | 1 | 2 | 3 | 4 | 5 | 6 | 7 |
| Polyester Monomers as raw material | Alcohol component (g) | Hydrogenated bisphenol A | (a) 3368 (100) | (b) 2113 (50) | (c) 2783 (83) | (d) 2603 (77) | (e) 2083 (53) | (f) 1826 (47) | (g) 3362 (100) |
| | | Glycerol | — | — | 213 (17) | — | — | — | — |
| | | Trimethylol propane | — | — | — | 437 (23) | 233 (10) | 227 (11) | — |
| | | Ethylene glycol | — | 546 (50) | — | — | 377 (37) | 420 (42) | — |
| | | Cyclohexane dimethanol | — | — | — | — | — | — | — |
| | | BPA-PO (*1) | — | — | — | — | — | — | — |
| | Carboxylic acid component (g) | Isophthalic acid | 1631 (70) | 2339 (80) | 2002 (80) | 1959 (84) | 2306 (84) | 2527 (90) | 1116 (48) |
| | | Trimellitic anhydride | — | — | — | — | — | — | — |
| | | Fumaric acid | — | — | — | — | — | — | 520 (32) |
| Catalyst | Tin (II) dioctylate (g) | | 25 | 25 | 25 | 25 | 25 | 25 | 25 |
| Properties | Softening point (° C.) | | 150 | 124 | 157 | 166 | 144 | 135 | 153 |
| | Glass transition temperature (° C.) | | 95 | 71 | 100 | 108 | 85 | 80 | 102 |
| | Acid value (mgKOH/g) | | 3 | 3 | 27 | 4 | 4 | 24 | 18 |
| | Number-average molecular weight | | 1200 | 1400 | 1500 | 2300 | 2000 | 1700 | 1400 |

| | | | Production Examples | | | | | | |
|---|---|---|---|---|---|---|---|---|---|
| | | | 8 | 9 | 10 | 11 | 12 | 13 | 14 |
| Polyester Monomers as raw material | Alcohol component (g) | Hydrogenated bisphenol A | (h) 3440 (100) | (i) — | (j) 1023 (21) | (k) — | (l) — | (m) — | (n) 1805 (47) |
| | | Glycerol | — | — | — | — | — | — | — |
| | | Trimethylol propane | — | 337 (11) | 286 (11) | — | — | — | 352 (16) |
| | | Ethylene glycol | — | 1326 (89) | 860 (68) | — | — | — | 374 (37) |
| | | Cyclohexane dimethanol | — | — | — | 1440 (100) | — | — | — |
| | | BPA-PO (*1) | — | — | — | — | 3500 (100) | 3348 (100) | — |
| | Carboxylic acid component (g) | Isophthalic acid | 761 (32) | 3337 (84) | 2830 (84) | 1278 (83) | 1245 (82) | 1652 (82) | 2468 (92) |
| | | Trimellitic anhydride | — | — | — | 307 (17) | 307 (18) | — | — |
| | | Fumaric acid | 799 (48) | — | — | — | — | — | — |
| Catalyst | Tin (II) dioctylate (g) | | 25 | 25 | 25 | 15 | 25 | 25 | 25 |
| Properties | Softening point (° C.) | | 152 | 115 | 120 | 128 | 121 | 116 | 165 |
| | Glass transition temperature (° C.) | | 101 | 48 | 61 | 73 | 71 | 71 | 94 |
| | Acid value (mgKOH/g) | | 20 | 1 | 2 | 41 | 22 | 14 | 7 |
| | Number-average molecular weight | | 1300 | 1900 | 2100 | — | 3700 | 4200 | 3000 |

Note
The numerals in parentheses each represent a molar ratio based on 100 mol as a total amount of alcohol component.
(*1) Polyoxypropylene (2.2)-2,2-bis(4-hydroxyphenyl)propane (molar number of addition of polyoxypropylene: 2.2 mol)

Examples 1 to 8 and Comparative Examples 1 to 6

Production of Resin Composition for Protective Layer Transfer Sheets

The respective polyesters produced in Production Examples 1 to 14 and an organic solvent were mixed and compounded with each other at 25° C. with the formulations as shown in Table 2 to prepare respective resin compositions (coating solutions) A to N for protective layer transfer sheets. In Table 2, the respective materials used are indicated by the following abbreviations.

HBPA: Hydrogenated bisphenol A
EG: Ethylene glycol
GLY: Glycerol
TMP: Trimethylol propane
CHDM: Cyclohexane dimethanol
BPO-PO: Polyoxypropylene (2.2)-2,2-bis(4-hydroxyphenyl)propane (molar number of addition of polyoxypropylene: 2.2 mol)
IPA: Isophthalic acid
FA: Fumaric acid
TMA: Trimellitic anhydride
Tol/MEK: Toluene/methyl ethyl ketone (weight ratio: 50/50)

(Production of Protective Layer Transfer Sheet (1))

The coating solutions A to N were respectively applied immediately after their preparation (within 24 hours) onto a polyethylene terephthalate film "LUMIRROR L-25T60" (tradename; available from Sekisui Chemical Co., Ltd.) using a wire bar such that a coating amount thereof after dried was 3.0 g/m$^2$, and then dried at 110° C. for 1 min, thereby obtaining a protective layer transfer sheet (1). In Comparative Example 4 in which the coating solution K was used, it was not possible to form a coating film and therefore obtain a protective layer transfer sheet as desired. Meanwhile, the coating solutions A to J and L to N were capable of forming a good coating film having a uniform thickness.

(Production of Print (1))

A thermal transfer ink sheet (1) ("Easy Photo Pack E-L50" (tradename) available from Canon Inc.) and a thermal transfer image-receiving sheet ("Easy Photo Pack E-L50" (tradename) available from Canon Inc.) were overlapped and pressed together under heating using a sublimation-type printer ("SELPHY ES-2" (tradename) available from Canon Inc.) to thermally transfer dyes without transfer of any protective layer and print a gradation pattern of the respective colors, thereby forming printed images on the thermal transfer image-receiving sheet (1). Next, the thermal transfer image-receiving sheet (1) with the printed images thus produced and the protective layer transfer sheet (1) obtained by the above method were overlapped on each other and pressed under heating using a laminator ("LFA341D" (tradename) available from IRIS OHYAMA Inc.; transfer temperature volume: 13) to transfer a protective layer and an adhesive layer onto the thermal transfer image-receiving sheet, thereby obtaining a print.

[Evaluation of Resin Composition for Protective Layer Transfer Sheets, Protective Layer Transfer Sheet (1) and Print (1)]

<Coating Solution Storing Property (Coating Film-Forming Property of Coating Solution Stored)>

The respective coating solutions A to N prepared were stored at 30° C. for 3 days, and thereafter applied onto a polyethylene terephthalate film "LUMIRROR L-25T60" and then dried in the same manner as described above to obtain a protective layer transfer sheet (1). The coating film formed in the thus obtained protective layer transfer sheet (1) was used to evaluate the coating solution stored.

The coating film of the thus obtained protective layer transfer sheet (1) was observed by naked eyes and evaluated according to the following ratings, The results are shown in Table 2.

(Evaluation Ratings)

A: Coating film had a uniform thickness, and thermal transfer printing thereon was possible.

B: Coating film had a slightly non-uniform thickness, but thermal transfer printing thereon was still possible.

C: Coating film had an apparently non-uniform thickness, but thermal transfer printing thereon was still possible.

D: No coating film was formable, and thermal transfer printing thereon was no longer possible.

(Light Fastness (1))

The prints obtained in Examples 1 to 8 and Comparative Examples 1 to 3, 5 and 6, were subjected to a light fastness test using a xenon weather meter under the following conditions.

Illumination tester: "SX75" (tradename) available from Suga Test Instruments Co., Ltd.
Light source: Xenon lamp
Filter: Inside: Quartz filter; Outside: #275
Panel temperature: 50° C.
Humidity inside of vessel: 35 to 50% RH
Illumination intensity: 50 W/m$^2$ (as the value measured at a wavelength of 300 to 400 nm)
Cumulative illumination intensity: 10,000 kJ/m$^2$ (as the cumulative value calculated over a wavelength range of 300 to 400 nm)

Amount of change in hue:

An optical reflection density of each of black (K), yellow (Y), magenta (M), cyan (C), green (G), red (R) and blue (B) images on the printed gradation pattern was measured using a reflectance spectrophotometer ("Spectro Eye" (tradename) available from GretagMacbeth Corporation). At the step where the optical reflection density before irradiated with light was near 1.0, the a* and b* values before and after irradiated with light were measured using a reflectance spectrophotometer "Spectro Eye", and an amount of change in hue was calculated from the measured values according to the following formula. Meanwhile, in the following formula, a*$_1$ and b*$_1$ respectively represent a* and b* values before irradiated with light, and a*$_2$ and b*$_2$ respectively represent a* and b* values after irradiated with light.

$$\text{Amount of change in hue} = [(a^*_1 - a^*_2)^2 + (b^*_1 - b^*_2)^2]^{1/2}$$

The light fastness was evaluated by a sum of amounts of change in hue of the black (K), yellow (Y), magenta (M), cyan (C), green (G), red (R) and blue (B) colors on the print (1). The smaller the amount of change in hue, the higher the light fastness becomes. The results are shown in Table 2.

<Anti-Kickback Property>

The resin composition for protective layer transfer sheets obtained in the same manner as described in the above Examples and Comparative Examples was applied on a base sheet to prepare a thermal transfer image-receiving sheet (image-receiving sheet to be evaluated). The thus obtained image-receiving sheet was evaluated for non-occurrence of color migration thereto to determine an anti-kickback property of the resin composition.

Specifically, first, the respective polyesters produced in Production Examples 1 to 10 and 12 to 14 and an organic solvent were compounded with each other at 25° C. with the formulations as shown in Table 2, and further 0.15 g of a polyether-modified silicone ("KF-615A" available from Shin-Etsu Chemical Co., Ltd.) as a releasing agent was added to the resulting mixture to prepare respective resin compositions for protective layer transfer sheets (coating solutions) A to J and L to N for evaluating an anti-kickback property thereof.

The coating solutions A to J and L to N for evaluating the anti-kickback property were respectively applied onto a synthetic paper ("YUPO FGS-250" (tradename) available from Yupo Corp.; thickness: 250 μm; basis weight: 200 g/m$^2$) using a wire bar such that a coating amount thereof after dried was 5.0 g/m², and then dried at 50° C. for 15 min, thereby obtaining an image-receiving sheet to be evaluated.

The thus obtained image-receiving sheet to be evaluated was overlapped with the above thermal transfer ink sheet (1) "Easy Photo Pack E-L50", and both the sheets were pressed together under heating using a sublimation-type printer "SELPHY ES-2" to thermally transfer dyes of the ink sheet and print a gradation pattern of black (K) onto the image-receiving sheet, thereby forming printed images. The thus obtained printed images were subjected to measurement for transferred color density for high-density printed pattern (18th gradation pattern (L=0)) using the above reflectance spectrophotometer "Spectro Eye". The smaller the transferred color density, the more excellent the anti-kickback property becomes. The results are shown in Table 2.

and anti-kickback property (for the protective layer transfer sheets) and capable of satisfying these properties at the same time as compared to the resin compositions, protective layer transfer sheets and prints obtained in the respective Comparative Examples.

Production Example 15

Thermal Transfer Sheet (2)

The following heat-resistant slip layer coating solution was applied onto one surface of a 4.5 μm-thick polyethylene terephthalate (PET) film by a gravure printing method (such that a coating amount thereof after dried was 0.4 g/m²), and then dried to form a heat-resistant slip layer thereon. Next, a

TABLE 2

| | | | | Examples | | | | | | | |
|---|---|---|---|---|---|---|---|---|---|---|---|
| | | | | 1 | 2 | 3 | 4 | 5 | 6 | 7 | 8 |
| Adhesive layer coating solution | Coating solution | | | A | B | C | D | E | F | G | N |
| | Polyester | Production Example No. | | 1 | 2 | 3 | 4 | 5 | 6 | 7 | 14 |
| | | Polyester | | (a) | (b) | (c) | (d) | (e) | (f) | (g) | (n) |
| | | Alcohol component | Kind | HBPA | HBPA/EG | HBPA/GLY | HBPA/TMP | HBPA/EG/TMP | HBPA/EG/TMP | HBPA | HBPA/EG/TMP |
| | | | Proportion (mol) | 100 | 50/50 | 83/17 | 77/23 | 53/37/10 | 47/42/11 | 100 | 47/37/16 |
| | | Carboxylic acid component | Kind | IPA | IPA | IPA | IPA | IPA | IPA | IPA/FA | IPA |
| | | | Proportion (mol) | 100 | 100 | 100 | 100 | 100 | 100 | 60/40 | 100 |
| | | | Amount compounded (g) | 2 | 2 | 2 | 2 | 2 | 2 | 2 | 2 |
| | Organic solvent | Kind | | Tol/MEK | Tol/MEK | Tol/MEK | Tol/MEK | Tol/MEK | Tol/MEK | Tol/MEK | Tol/MEK |
| | | Amount compounded (g) | | 8 | 8 | 8 | 8 | 8 | 8 | 8 | 8 |
| | Evaluation | Coating solution storing property | Coating film-forming property | B | B | A | A | A | A | B | A |
| Sheet | Evaluation | Anti-kickback property | Density | 0.53 | 0.68 | 0.66 | 0.63 | 0.65 | 0.66 | 0.59 | 0.63 |
| Print | Evaluation | Light fastness (1) | ΔE | 23 | 33 | 36 | 36 | 30 | 35 | 35 | 30 |

| | | | | Comparative Examples | | | | | |
|---|---|---|---|---|---|---|---|---|---|
| | | | | 1 | 2 | 3 | 4 | 5 | 6 |
| Adhesive layer coating solution | Coating solution | | | H | I | J | K | L | M |
| | Polyester | Production Example No. | | 8 | 9 | 10 | 11 | 12 | 13 |
| | | Polyester | | (h) | (i) | (j) | (k) | (l) | (m) |
| | | Alcohol component | Kind | HBPA | EG/TMP | HBPA/EG/TMP | CHDM | BPA-PO | BPA-PO |
| | | | Proportion (mol) | 100 | 89/11 | 21/68/11 | 100 | 100 | 100 |
| | | Carboxylic acid component | Kind | IPA/FA | IPA | IPA | IPA/TMA | IPA/TMA | IPA |
| | | | Proportion (mol) | 40/60 | 100 | 100 | 83/17 | 82/18 | 100 |
| | | | Amount compounded (g) | 2 | 2 | 2 | 2 | 2 | 2 |
| | Organic solvent | Kind | | Tol/MEK | Tol/MEK | Tol/MEK | Tol/MEK | Tol/MEK | Tol/MEK |
| | | Amount compounded (g) | | 8 | 8 | 8 | 8 | 8 | 8 |
| | Evaluation | Coating solution storing property | Coating film-forming property | B | C | A | D | A | A |
| Sheet | Evaluation | Anti-kickback property | Density | 0.60 | 1.26 | 0.89 | — | 1.48 | 1.46 |
| Print | Evaluation | Light fastness (1) | ΔE | 41 | 45 | 42 | — | 41 | 39 |

From the results shown in Table 2, it was confirmed that the resin compositions for protective layer transfer sheets obtained in the respective Examples and the protective layer transfer sheets and prints produced using the resin compositions were excellent in all of coating solution storing property (for the resins compositions), light fastness (for the prints)

primer layer coating solution having the below-mentioned composition was applied onto a part of a rear surface of the base sheet opposed to the surface on which the heat-resistant slip layer was formed, using a gravure printing machine such that a coating amount thereof after dried was 0.10 g/m², and dried to form a primer layer thereon. Then, a yellow dye layer coating solution (Y), a magenta dye layer coating solution (M) and a cyan dye layer coating solution (C) each having the below-mentioned composition were sequentially applied onto the thus formed primer layer using a gravure printing machine such that a coating amount of each layer after dried was 0.6 g/m², and then dried to thereby obtain a thermal transfer colorant layer in which a yellow dye layer, a magenta dye layer and a cyan dye layer were repeatedly formed on the primer layer in this order.

Composition of Heat-Resistant Slip Layer Coating Solution:

| | |
|---|---|
| Polyamide imide resin (solid content: 25%) ("HR-15ET" (tradename) available from Toyobo Co., Ltd.) | 13 parts |
| Polyamide silicone resin (solid content: 25%) ("HR-14ET" (tradename) available from Toyobo Co., Ltd.) | 13 parts |
| Silicone oil ("KF965-100" (tradename) available from Shin-Etsu Chemical Co., Ltd.) | 0.7 parts |
| Zinc stearyl phosphate ("LBT-1870 (purified product)" (tradename) available from Sakai Chemical Industry Co., Ltd.) | 2.6 parts |
| Zinc stearate ("GF-200" (tradename) available from NOF Corp.) | 2.6 parts |
| Talc ("MICRO ACE P-3" (tradename) available from Nippon Talc Co., Ltd.) | 2.6 parts |
| Modified ethanol | 32.8 parts |
| Toluene | 32.7 parts |

| Primer Layer Coating Solution: | |
|---|---|
| Alumina sol (solid content: 10%) ("Alumina Sol 200 (feathery form)" (tradename) available from Nissan Chemical Industries, Ltd.) | 50 parts |
| Polyvinyl pyrrolidone resin ("K-90" (tradename) available from ISP Inc.) | 5 parts |
| Water | 25 parts |
| Isopropyl alcohol | 20 parts |

| <Yellow Dye Layer Coating Solution (Y)> | |
|---|---|
| Disperse dye (Disperse Yellow 231) | 2.5 parts |
| Disperse dye (Yellow Dye A represented by the following chemical formula) | 2.5 parts |
| Binder resin (polyvinyl acetoacetal resin) ("KS-5" (tradename) available from Sekisui Chemical Co., Ltd.) | 4.5 parts |
| Polyethylene wax | 0.1 parts |
| Methyl ethyl ketone | 45.0 parts |
| Toluene | 45.0 parts |

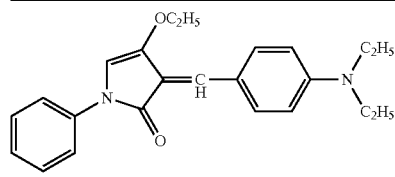

| <Magenta Dye Layer Coating Solution (M)> | |
|---|---|
| Disperse dye (MS Red G) | 1.5 parts |
| Disperse dye (Macrolex Red Violet R) | 2.0 parts |
| Binder resin (polyvinyl acetoacetal resin) ("KS-5" (tradename) available from Sekisui Chemical Co., Ltd.) | 4.5 parts |
| Polyethylene wax | 0.1 parts |
| Methyl ethyl ketone | 45.0 parts |
| Toluene | 45.0 parts |

| <Cyan Dye Layer Coating Solution (C)> | |
|---|---|
| Disperse dye (Solvent Blue 63) | 2.5 parts |
| Disperse dye (Disperse Blue 354) | 2.5 parts |
| Binder resin (polyvinyl acetoacetal resin) ("KS-5" (tradename) available from Sekisui Chemical Co., Ltd.) | 4.5 parts |
| Polyethylene wax | 0.1 parts |
| Methyl ethyl ketone | 45.0 parts |
| Toluene | 45.0 parts |

Examples 9 to 13 and Comparative Example 7

Protective Layer Transfer Sheet (2)

The following heat-resistant slip layer coating solution was applied onto one surface of a 4.5 μm-thick polyethylene terephthalate (PET) film by a gravure printing method (such that a coating amount thereof after dried was 0.4 g/m²), and then dried to form a heat-resistant slip layer thereon. Next, a release layer coating solution having the below-mentioned composition was applied onto a part of a rear surface of the above base sheet opposed to the surface on which the heat-resistant slip layer was formed, using a gravure printing machine such that a coating amount of the coating solution was 1.0 g/m² in terms of a solid content thereof, and dried to form a release layer thereon. Then, a protective layer (adhesive layer) coating solution having the composition shown in Table 3 was applied onto the thus formed release layer using a gravure printing machine such that a coating amount of the coating solution was 1.5 g/m² in terms of a solid content thereof, and then dried to thereby form a protective layer (adhesive layer) on the release layer. The abbreviations of the materials used as shown in Table 3 are the same as those shown in Table 2.

Meanwhile, upon preparation of the protective layer (adhesive layer) coating solution, "UVA635L" (tradename) available from BASF Japan Ltd., was used as an acrylic copolymer to which the reactive ultraviolet absorber was reacted and bonded, and "Silysia 310" (tradename) available from Fuji Silysia Chemical Ltd., was used as silica.

| <Release Layer Coating Solution> | |
|---|---|
| Polymethyl methacrylic acid (PMMA; weight-average molecular weight: 25000) ("DIANAL BR-87" (tradename) available from Mitsubishi Rayon Co., Ltd.) | 20.0 parts |
| Methyl ethyl ketone | 40.0 parts |
| Toluene | 40.0 parts |

[Evaluation of Protective Layer Transfer Sheet (2)]
<Actual Kickback Property>

The thermal transfer sheet (2) and the protective layer transfer sheet (2) obtained in each of Examples 9 to 13 and Comparative Example 7 were overlapped such that the magenta dye layer of the thermal transfer sheet (2) faced to the heat-resistant slip layer of the protective layer transfer sheet (2), and a load of 20 kg/cm² was applied to the thus laminated sheets. The resulting laminate was stored at a temperature of 40° C. and a humidity of 90% for 96 hours while being maintained under the loaded condition to migrate (kick) dyes in the dye layer of the thermal transfer sheet (2) onto the side of the heat-resistant slip layer of the protective layer transfer sheet (2).

Next, the above protective layer transfer sheet (2) was overlapped on another protective layer transfer sheet (2) such that the heat-resistant slip layer of the former sheet faced to a protective layer of the latter sheet, and the resulting laminate was stored at a temperature of 50° C. and a humidity of 20% for 24 hours while applying a load of 20 kg/cm² thereto.

Thereafter, the protective layer transfer sheet (2) having the protective layer onto which the dyes on the heat-resistant slip layer was migrated (backed) was overlapped on an image-receiving surface of an image-receiving paper ("Color Ink/Paper Set KP-36IP" (tradename) available from Canon Corp.) to transfer the dyes on the protective layer to the image-receiving paper using a lamination tester ("Lamipacker LPD2305PRO" (tradename) available from FUJIPLA Inc.) at a temperature of 110° C. and a rate of 4 mm/s/line. Further, the base sheet was released from the image-receiving sheet, and the hue values on the dye-transferred portion thereof were measured using a reflectance color density meter ("GRETAG Spectrolino" (tradename) available from Gretag-Macbeth Corporation; D65 light source; visibility angle: 2°) to thereby calculate a color difference (ΔE*) according to the following formula. The smaller the color difference value, the more excellent the actual kickback property becomes. The results are shown in Table 3.

$$\Delta E^* = [(\text{difference in } L^* \text{value between before and after being overlapped})^2 + (\text{difference in } a^* \text{value between before and after being overlapped})^2 + (\text{difference in } b^* \text{value between before and after being overlapped})^2]^{1/2}$$

<Light Fastness (2)>

A standard paper of A4 size for exclusive use in a printer "P-400" (tradename) available from OLYMPUS Corp., was used as a dye receptor sheet for receiving transferred images. The thermal transfer sheet (2) and the above dye receptor sheet were overlapped such that the dye layer of the thermal transfer sheet (2) faced to a dye-receiving surface of the dye receptor sheet, and the thermal transfer printing was carried out by pressing a thermal head against a rear surface of the thermal transfer sheet (2) to thereby form a gray solid image on the dye receptor sheet. In addition, after forming the solid image, the respective protective layer transfer sheets (2) produced in the above Examples and Comparative Examples were overlapped on the solid image, and a thermal transfer resin layer of the respective protective layer transfer sheets (2) was transferred onto the solid image using the thermal head of the same printer as used above to thereby obtain a gray solid image covered with a protective layer.

(Printing Conditions)

Thermal head: "F3598" (tradename) available from Toshiba Hokuto Electronics Corp.
Average electric resistance of heat generator: 5176 (Ω)
Printing density in horizontal scanning direction: 300 dpi
Printing density in vertical scanning direction: 300 dpi
Printing power: 0.07 (W/dot)
Line period: 2 (ms)
Pulse duty: 85%
Printing initiation temperature: 35.5 (° C.)

(Colorimetric Conditions)

Colorimeter: Spectrometer "SpectroLino" (tradename) available from GretagMacbeth Corporation
Light source: D65
Visibility angle: 2°
Filter: ANSI Status A The resulting print was irradiated with an ultraviolet ray for 96 hours using a xenon weatherometer ("ATLAS Ci4000" (tradename); black panel temperature: 50° C.; filter: S-type borosilicate; inside conditions: 40° C., 50% RH; irradiation control: 340 nm ultraviolet ray fixed to 0.35 w/m²) to measure a change in density and a change in hue between before and after the irradiation. Upon measurement of the change in density, the density residual percentage was calculated according to the following formula. The change in density (ΔE*ab) between before and after the irradiation was calculated according to the following formula. The larger density residual percentage indicates a more excellent light fastness, whereas the smaller amount of change in hue indicates a more excellent light fastness. The results are shown in Table 3.

Density residual percentage (%)=density after test/initial density×100

$$\Delta E^* ab = [(L^* \text{after irradiation} - L^* \text{before irradiation})^2 + (a^* \text{after irradiation} - a^* \text{before irradiation})^2 + (b^* \text{after irradiation} - b^* \text{before irradiation})^2]^{1/2}$$

wherein L*, a* and b* are values based on CIE1976L*a*b* color specification system, and L* represents a lightness whereas a* and b* respectively represent a chromaticity.

TABLE 3

| | | | | Examples | | | | | Comparative |
|---|---|---|---|---|---|---|---|---|---|
| | | | | 9 | 10 | 11 | 12 | 13 | Examples 7 |
| Adhesive layer coating solution | Coating solution | | | O | P | Q | R | S | T |
| | Polyester | Production Example No. | | 3 | 4 | 5 | 6 | 14 | 10 |
| | | Polyester | | (c) | (d) | (e) | (f) | (n) | (j) |
| | | Alcohol component | Kind | HBPA/GLY | HBPA/TMP | HBPA/EG/TMP | HBPA/EG/TMP | HBPA/EG/TMP | HBPA/EG/TMP |
| | | | Proportion (mol) | 83/17 | 77/23 | 53/37/10 | 47/42/11 | 47/37/16 | 21/68/11 |
| | | Carboxylic acid component | Kind | IPA | IPA | IPA | IPA | IPA | IPA |
| | | | Proportion (mol) | 100 | 100 | 100 | 100 | 100 | 100 |
| | | Amount compounded (g) | | 2 | 2 | 2 | 2 | 2 | 2 |
| | Acrylic copolymer reacted and bonded with ultraviolet absorber | Amount compounded (g) | | 0.5 | 0.5 | 0.5 | 0.5 | 0.5 | 0.5 |
| | Silica | Amount compounded (g) | | 0.1 | 0.1 | 0.1 | 0.1 | 0.1 | 0.1 |
| | Organic solvent | Kind | | Tol/MEK | Tol/MEK | Tol/MEK | Tol/MEK | Tol/MEK | Tol/MEK |
| | | Amount compounded (g) | | 8 | 8 | 8 | 8 | 8 | 8 |
| Sheet | Evaluation | Actual kickback property | ΔE | 2.10 | 1.31 | 1.39 | 1.31 | 1.30 | 3.36 |
| Print | Evaluation | Light fastness (2) | Density residual percentage (%) | 89% | 94% | 92% | 88% | 92% | 86% |
| | | | ΔE | 12.2 | 12.3 | 11.5 | 14.0 | 12.6 | 20.1 |

From the results shown in Table 3, it was confirmed that the resin compositions for protective layer transfer sheets obtained in the respective Examples and the protective layer transfer sheets and prints produced using the resin compositions were excellent in all of coating solution storing property (for the resins compositions), light fastness (for the prints) and anti-kickback property (for the protective layer transfer sheets) and capable of satisfying these properties at the same time as compared to the resin compositions, protective layer transfer sheets and prints obtained in the respective Comparative Examples.

INDUSTRIAL APPLICABILITY

The resin composition for protective layer transfer sheets according to the present invention is excellent in coating solution storing property, and is capable of providing a protective layer transfer sheet having an excellent anti-kickback property and a print having an excellent light fastness.

The invention claimed is:

1. A protective layer transfer sheet comprising a substrate having a layer to be bonded to a surface of a thermal transfer image-receiving sheet, wherein a resin composition for protective layer transfer sheets is incorporated in the layer and comprises a polyester resin produced by polycondensing a polyhydric alcohol component containing a hydrogenated bisphenol A in an amount of 30 mol % or more and a polycarboxylic acid component containing a benzenedicarboxylic acid in an amount of 50 mol % or more.

2. The protective layer transfer sheet according to claim 1, wherein the benzenedicarboxylic acid is isophthalic acid.

3. The protective layer transfer sheet according to claim 1, wherein the polyhydric alcohol component contains an aliphatic polyol having 2 to 6 carbon atoms in an amount of from 10 to 70 mol %.

4. The protective layer transfer sheet according to claim 3, wherein the aliphatic polyol includes a triol having 3 to 6 carbon atoms.

5. The protective layer transfer sheet according to claim 1, wherein the polyester resin has a number-average molecular weight of from 1,000 to 10,000.

6. A print comprising a printed surface on which images are formed by a thermal transfer printing method, and a protective layer transferred and formed on the printed surface by using a protective layer transfer sheet comprising a substrate having a layer to be bonded to a surface of a thermal transfer image-receiving sheet, wherein a resin composition for protective layer transfer sheets is incorporated in the layer and comprises a polyester resin produced by polycondensing a polyhydric alcohol component containing a hydrogenated bisphenol A in an amount of 30 mol % or more and a polycarboxylic acid component containing a benzenedicarboxylic acid in an amount of 50 mol % or more.

* * * * *